United States Patent
Penttinen et al.

(10) Patent No.: US 7,329,460 B2
(45) Date of Patent: Feb. 12, 2008

(54) ALUMINUM-COLORED MULTILAYER HEAT-SEALABLE PACKAGING MATERIAL

(75) Inventors: Tapani Penttinen, Huutjärvi (FI); Jalliina Järvinen, Hamburg (DE); Kimmo Nevalainen, Karhula (FI); Erkki Laiho, Porvoo (FI); Markku Sainio, Porvoo (FI); Martti Vähälä, Porvoo (FI)

(73) Assignee: Stora Enso Oyj, Helsinki (FI)

( * ) Notice: Subject to any disclaimer, the term of this patent is extended or adjusted under 35 U.S.C. 154(b) by 217 days.

(21) Appl. No.: 10/181,357

(22) PCT Filed: Apr. 9, 2001

(86) PCT No.: PCT/FI01/00346

§ 371 (c)(1), (2), (4) Date: Sep. 4, 2002

(87) PCT Pub. No.: WO01/76976

PCT Pub. Date: Oct. 18, 2001

(65) Prior Publication Data

US 2003/0059591 A1 Mar. 27, 2003

(30) Foreign Application Priority Data

Apr. 10, 2000 (FI) ................................. 20000847

(51) Int. Cl.
*B32B 9/04* (2006.01)
*B32B 27/08* (2006.01)

(52) U.S. Cl. ................................ 428/411.1; 428/476.9; 428/516; 428/689; 53/170

(58) Field of Classification Search ................ 428/354, 428/510, 411.1, 474.4, 476.3, 476.9, 500, 428/516, 523, 688, 689; 53/463, 477, 170
See application file for complete search history.

(56) References Cited

U.S. PATENT DOCUMENTS

| 3,861,931 A | * | 1/1975 | Taylor ........................ 252/582 |
| 4,147,291 A | | 4/1979 | Akao et al. |
| 4,452,846 A | | 6/1984 | Akao |

(Continued)

FOREIGN PATENT DOCUMENTS

CH 689 487 A 5/1999

(Continued)

*Primary Examiner*—Thao Tran
(74) *Attorney, Agent, or Firm*—Birch, Stewart, Kolasch & Birch, LLP

(57) ABSTRACT

The invention relates to a multi-layer heat-sealable packaging material especially for food packages. In addition, objects of the invention are a food package formed of the said packaging material, a method of packaging, and the use of the material for packages. The packaging material (1) comprises a middle layer (3) of fibre material, such as cardboard; at least one polymeric protective layer (4, 5) protecting the product from going bad; and polymeric heat sealing layers (2, 7) preferably on both sides of the packaging material. According to the invention, the heat sealing layer (7) forming the inner surface of the closed package, is blended with light-absorbing pigment, such as carbon black, for protecting the product from visible light. By further blending white pigment, such as titanium dioxide, into the heat sealing layer (7), a grey tint resembling an aluminium foil has been achieved for the layer. The heat sealing polymer may be low-density polyethylene (PE-LD), and an oxygen and aroma proof sealing layer (4) of, for example, ethylene vinyl alcohol copolymer (EVOH) or polyamide (PA) may be provided between it and the cardboard (3).

13 Claims, 3 Drawing Sheets

U.S. PATENT DOCUMENTS

Figure 1:
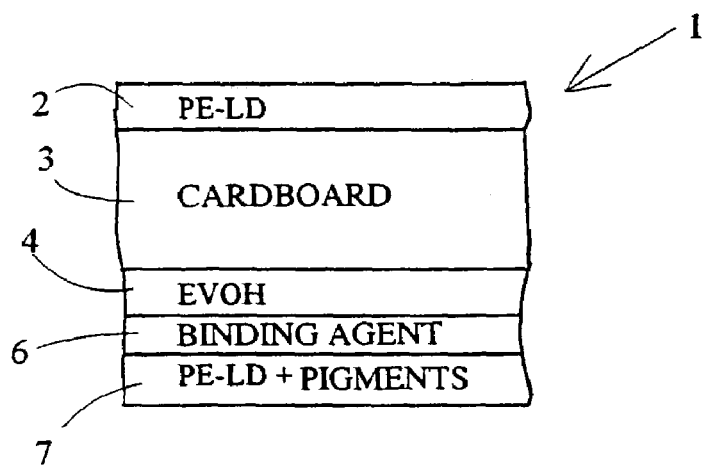

| | | | |
|---|---|---|---|
| 4,521,437 A | | 6/1985 | Storms |
| 4,876,129 A | | 10/1989 | Akao |
| 5,358,785 A | * | 10/1994 | Akao et al. .................. 428/349 |
| 5,738,933 A | * | 4/1998 | Koskiniemi et al. ........ 428/214 |

FOREIGN PATENT DOCUMENTS

| | | |
|---|---|---|
| DE | 42 03 707 | 7/1993 |
| EP | 0 276 018 A | 7/1988 |
| FI | 96752 | 5/1996 |
| FI | 980086 | 1/1998 |
| JP | 6135439 A | 5/1994 |
| JP | 8011157 A | 1/1996 |
| WO | 97/02948 | 1/1997 |
| WO | 98/30390 | 7/1998 |
| WO | 98/54410 | 12/1998 |
| WO | 99/61245 | 12/1999 |

\* cited by examiner

ALUMINUM-COLORED MULTILAYER HEAT-SEALABLE PACKAGING MATERIAL

The present invention relates to multi-layer heat-sealable packaging material, especially for food packages. The packaging material is based on a middle layer of fibre material, such as cardboard, besides which it contains one or several protective layers for extending the durability time of the packed product, and heat sealing polymer on the surface of the material for closing the package. In addition, the invention relates to a method based on the use of the packaging material, a food package closed by heat sealing, and the use of the packaging material for food packages, such as heat-sealed milk and juice cartons.

It has been tried to make the packages for perishable liquid foods, such as milk products and juices, oxygen and aroma proof for improving the durability. The traditional procedure has been to provide the fibre-based packaging material with a grey aluminium foil, which provides an efficient protection against the penetration of oxygen in the air and the escape of aromas in the packed product. However, the use of aluminium foil used for a long time is now decreasing due to its high costs, environmental hazards and regulations concerning the recycling of materials. Aluminium is undecomposable on dumping areas, and it is difficult to regenerate packaging cardboard lined with aluminium.

Aluminium used as an oxygen and aroma barrier in food packages has been replaced by polymers to an increasing extent; the most important polymers being ethyl vinyl alcohol copolymer (EVOH), polyamide (PA), and polyethylene terephthalate (PET). By combining these polymers with binding agents and heat sealing polymers, multi-layer cardboard has been formed, with which sealing characteristics almost comparable with aluminium have at best been achieved.

Another trend also depending on material costs and tightening environmental regulations has been to decrease the amount of polymer used for the coating of packaging cardboard. One known polymer-coated food packaging cardboard, in which good oxygen and aroma barrier and low material amounts in polymeric sealing and binding agent layers have simultaneously been achieved, has been described in the publication print FI-96752. The advantageousness of the packaging cardboard of the publication is substantially based on the low heat sealing temperature of about 250° C., with which it is possible to prevent the formation of holes in the polymer layer at the closing stage of the package and the resulting weakening of the gas barrier. Also the risk of the taste and smell of the product being harmed is reduced, as the heat sealing temperature is as low as possible.

According to the publication FI-96752 it is possible to incorporate glimmer into the EVOH sealing layer for improving the adhesion of the layer to cardboard. It has also been shown that the glimmer effects the gas barrier and reduces the permeability of ultraviolet light. The patent application FI-980086 further describes a multi-layer packaging cardboard, in which a considerable amount of talcum has been added to the polymer in the gas barrier layer. Also this application discloses a UV protection generated with a sealing layer, according to the application by adding to the layer, besides talcum, also a dye pigment comprising at most 5% of the weight of the layer.

If the packaging cardboard and its polymeric coating layers are thick, they form a relatively good protection against the transmission of both ultraviolet radiation and visible light. The fact that the ultraviolet radiation used as heat sealing polymer has a weakening effect on polyethylene is mainly an advantage, as it promotes the material decomposition on dumping areas. However, as it has been the trend to thin the packaging material, the consequence has been that the transmission of visible light has increased. This is especially the case when bleached sulphate pulp is used in the material, which is best suitable for food packages because of its organoleptic properties. Unbleached pulp efficiently absorbs light, but its use in food packages is avoided because of its possibly detrimental effect on smell and flavour. No transmission of light or UV radiation occurred in traditional packaging materials provided with aluminium foil.

The present invention is partially based on the observation that the multi-layer packaging cardboard according to the publication FI-96752 and respective modern packaging cardboard can let through even 10% of visible light coming across it, and partly on the observation that, similar to oxygen, also this light may have a detrimental effect on the durability and quality of packed food. The measurements carried out show that the light penetrating the packaging material splits ascorbic acid in juice, thus reducing its amount to about one third of the original during a storage time of five weeks. In an otherwise similar preservation test, in which the effect of light was eliminated, about 75% of the ascorbic acid remained after the end of the test.

Due to the said surprising observations, it is the object of the invention to provide a solution, with which the detrimental transmission of light through the packaging material can be prevented. The invention thus comprises a heat-sealable packaging material which contains, besides the middle layer of fibre material, at least one gas proof polymeric sealing layer protecting the packed product and at least one polymeric heat sealing layer as the surface layer of the material; the invention is characterised in that the heat sealing layer contains a pigment that absorbs light for protecting the product from visible light.

The invention thus requires that a pigment blending with heat sealing polymer be used, which absorbs the visible light on the wavelength area of 400-700 nm. Most efficient pigments are black pigments absorbing over the entire wavelength area, such as carbon black, which is not toxic and which is thus suitable for food packages. Carbon black also provides an efficient protection against ultraviolet radiation penetrating the package.

Incorporating the pigment into the heat sealing layer is first of all due to the fact that the heat sealing layer generally is considerably thicker than the other polymeric coating layers in the multi-layer cardboard; the pigment achieves a smoother overlap in the polymeric layer without stripes disturbing the appearance of the layer. Secondly, the sealing characteristics of polymers in the oxygen barrier layer often depend on their purity, due to which one tends to avoid adding foreign components to these. Pigments blend well with polyolefins typically used as heat sealing polymer, and in the concentrations used, they do not hinder the extrudability or heat-sealability of the polymer.

Especially advantageously the heat sealing layer of the food package material according to the present invention has been tinted grey by mixing appropriately a black pigment and a white pigment. The white pigment reflects light from the surface of the material and thus reduces the transmission of light of the material. However, a more important advantage is the appearance of the material which has been pigmented grey; the grey surface layer namely looks like the aluminium foil traditionally used in food packages, which consumers have got accustomed to in course of time. This matter is very important for getting the material approved in the market. Black pigment in itself would produce a nondescript dark, aesthetically questionable material surface, which could be resented by markets although the material would be functional in every aspect from the technical point of view.

In practice, the transmission of light in wavelengths of visible light can be made to fall almost to zero by adding a rather small amount of black pigment into the heat seal polymer. The amount of pigment in the heat sealing layer can be between about 0.05 and 0.5 wt. %, preferably about 0.10-0.30 wt. %, and most preferably about 0.10-0.20 wt. %. 0.2 wt. % is a limit, the exceeding of which does not improve the absorption in practice, but which may be exceeded for achieving a suitable level of grey. Considering the suitable level of grey, the amount of white pigment has to be considerably bigger than the amount of black pigment, such as about 5-25%, preferably about 10-20%, and most preferably about 10-15% of the weight of the heat sealing layer. By blending 0.15 wt. % of carbon black and 12 wt. % of titanium dioxide with a low-density polyethylene (PE-LD), an optimal heat sealing concentration has been found, which on cardboard deceptively resembles aluminium foil.

The density of low-density polyethylene in the heat sealing layers may be 912-935 kg/m$^3$, preferably 915-930 kg/m$^3$, and the melt viscosity (MFR$_2$) 0.5-20 g/10 min., preferably 3-10 g/10 min. In addition to pigments, at most 0.5% of molecular sieve, such as sodium aluminium silicate, can be incorporated into the heat sealing layer as deodoriser.

The packaging material of heat-sealable packages is normally provided with a polymeric heat sealing layer on both sides. Only the heat sealing layer remaining inside the packages is then pigmented in accordance with the invention. The heat sealing layer on the outer surface of the package is left colourless so that it would not cover the printings on the cardboard.

Relating to the oxygen sealing layer of the package material of the invention, reference is made especially to the publication print FI-96752. In the said publication, the oxygen barrier polymer can be EVOH, PET or PA, the latter blended with EVOH; in addition to these, also PA as such; separate EVOH and PA layers adhered to each other; and sealing polymers blended with minerals, such as talcum, may also come to question. In all cases, the oxygen and aroma barrier and protection against visible light are combined in the same packaging material according to the invention.

The invention further comprises heat-sealable packaging material, which contains, besides the middle layer of fibre material, at least one polymeric-based protective layer tinted grey by blending into it light-absorbing black pigment, such as carbon black, and white pigment, such as titanium dioxide, so that the black pigment provides the packed product with protection against visible light, the said grey protective layer acting simultaneously as the heat sealing layer for the material. The blend proportions of pigments in the protective layer can be as presented above. The material is suitable for a packed product which has to be, above all, protected from light during its storage.

It is characteristic of the method of the invention for the packaging of food, in which a carton or case is bent from packaging material comprising a middle layer of cardboard, at least one gas proof polymeric sealing layer and at least one polymeric heat sealing layer, into which food is closed by heat sealing, that the heat seal layer is blended with light-absorbing pigment for protecting the food from visible light. The heat sealing layer is preferably tinted grey by using pigments, as is described above. The carbon black and titanium dioxide pigments used in the invention do not disturb the heat sealing of the package, so that about 250° C. is sufficient for the heat sealing temperature. Thus, the technology known from the publication FI-96752 can in itself be utilised in the invention without losing any of the advantages mentioned in the publication.

In relation to the finished food package of the invention and the use of the packaging material of the invention, reference is made to the enclosed claims.

Figure 6:
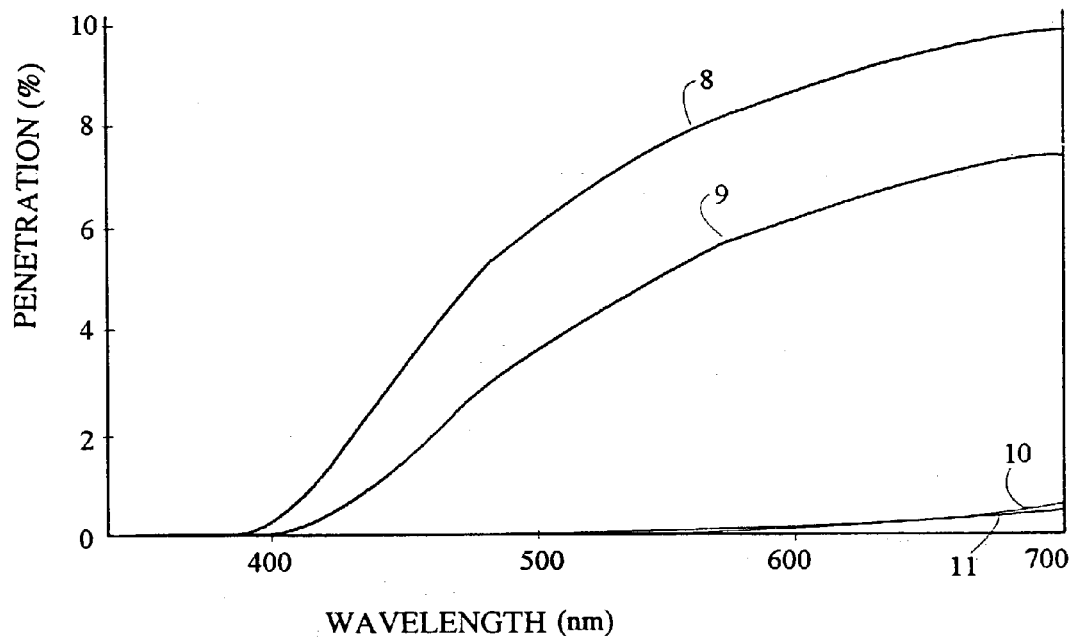
Figure 7:
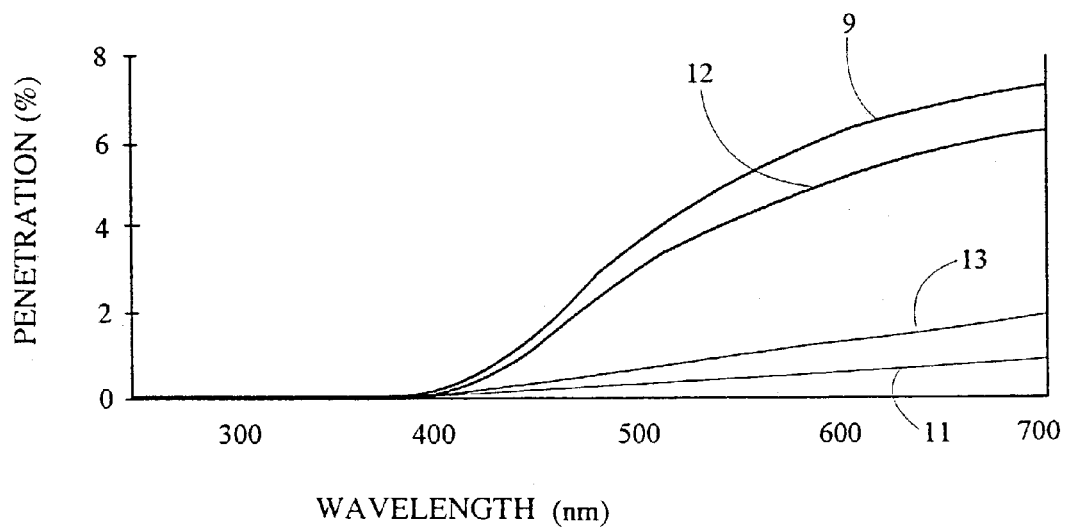

The invention is next explained in more detail by way of example, referring to the enclosed drawings, in which FIGS. 1-5 schematically present five different laminated packaging materials of the invention; and FIGS. 6 and 7 describe the transmission of light as a function of the wavelength of light, measured from some packaging materials of the invention and some packaging materials representing the known state of technology.

Figure 2:
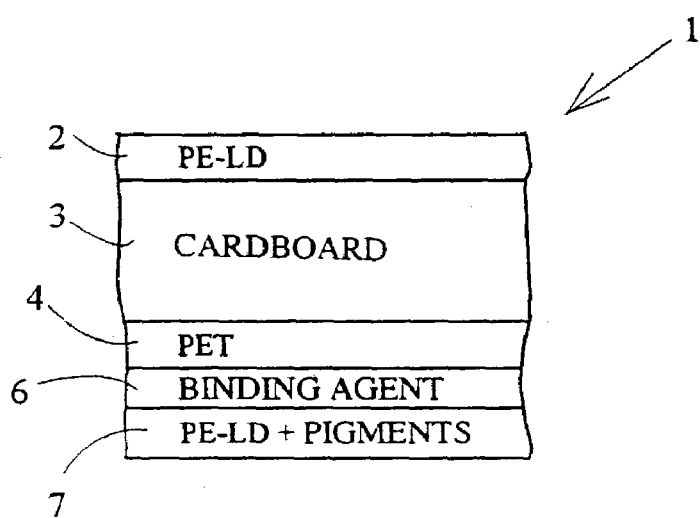
Figure 3:
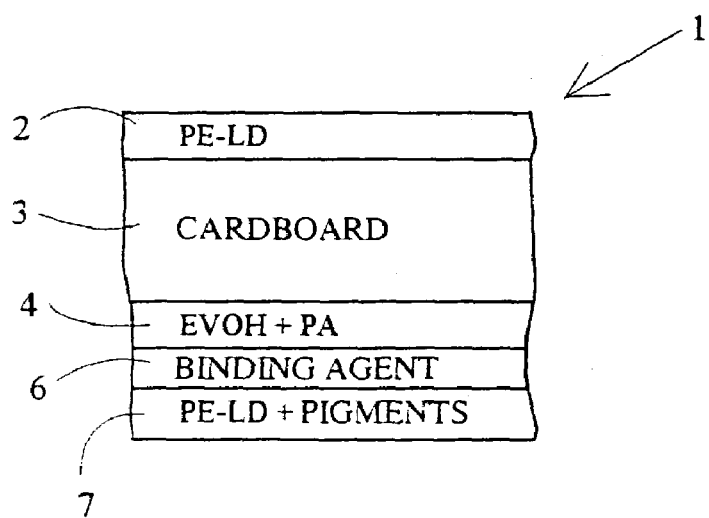
Figure 4:
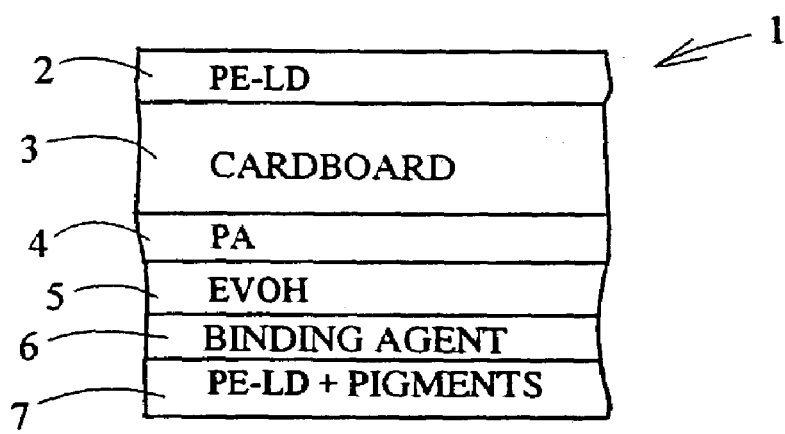
Figure 5:
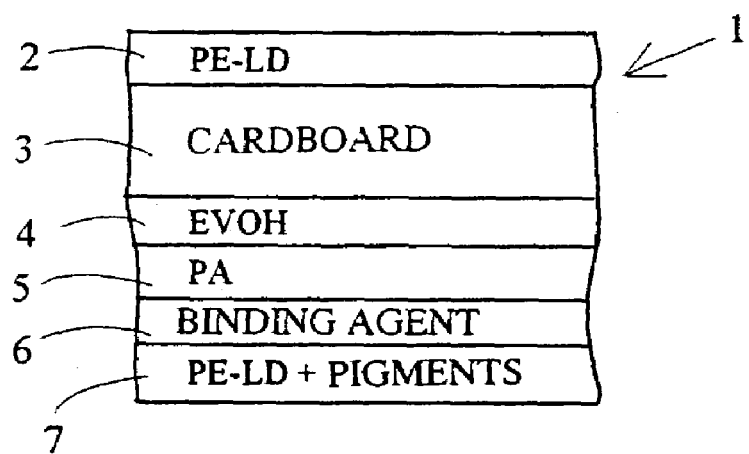

FIGS. 1-5 are examples of multi-layer heat-sealable packaging materials of the invention principally for the packaging of food. The packaging material 1 consists in both cases of a heat-sealable surface layer 2 of low-density polyethylene (PE-LD), which forms the outer surface for the finished, closed package. This is followed by a middle layer 3 of fibre material, which may be, for example, cardboard of bleached sulphate pulp. Next in FIGS. 1-3 is a polymeric, oxygen and aroma proof sealing layer 4, the material of which is ethylene vinyl alcohol copolymer (EVOH), polyethylene terephthalate (PET), or a mixture of ethylene vinyl alcohol copolymer (EVOH) and polyamide (PA). The packaging materials of FIGS. 4 and 5 comprise two sealing layers 4, 5 adhered to each other, the materials of which are EVOH and PA; in FIG. 4, PA is placed against cardboard and EVOH is adhered to PA, and in FIG. 5, EVOH is against cardboard and PA is adhered to EVOH. The sealing layer 4 or layers 4, 5 is followed by a binding agent layer 6, which is, for example, low-density polyethylene modified with maleic anhydride, and the purpose of which is to bind the sealing layer to the heat sealing layer 7 of low-density polyethylene (PE-LD) forming the inner surface of the package.

In the package materials 1 shown, one or several pigments have been incorporated into the heat sealing layer 7 forming the inner surface of the package according to the invention, the intention being to prevent visible light from penetrating into the closed package, in which light could harm the packed product. Preferably the pigment used in accordance with the invention is carbon black, which already in low concentrations provides an almost perfect protection against light. According to the invention, also white pigment, such as titanium dioxide, can be added into the heat sealing layer 7, which has some effect on the light protection but which, above all, provides the heat sealing layer with an aesthetically pleasant appearance resembling an aluminium foil.

In the packaging materials 1 shown, the weight of the middle layer 3 of cardboard is at least 170 g/m$^2$, preferably 200-400 g/m$^2$. The superimposed polymeric layers 4-7 can be placed to the cardboard 3 as one stage by coextrusion. The amount of material of the sealing layers 4, 5 and the binding agent layer 6 are 1-10 g/m$^2$ per layer, preferably 2-5 g/m$^2$. The amount of material of both the heat sealing layers 1, 7 is 5-60 g/m$^2$, preferably 20-50 g/m$^2$, and most preferably 30-40 g/m$^2$. The share of carbon black in the heat sealing layer 7 forming the inner surface of the package is 0.05-0.5 wt. %, preferably about 0.15 wt. %, and the share of titanium dioxide is 5-25 wt. %, preferably about 12 wt. %, respectively.

The packaging material of the invention manufactured as a continuous web can be die cut as blanks, which again can be bent and heat-sealed to form closed food packages. The heat sealing temperature is at most about 250° C. Packed products may be especially liquid foods, for example, juices and milk products, such as milk, cream, sour milk, yoghurt, and ice-cream. Likewise box-like packages for dry foods are possible, such as packages for flour, powders, flakes, cereal, and animal food. Further, closed dishes for ready-prepared foods can be provided, in which both the dish and its lid are made of light-impermeable packaging material of the invention.

In FIGS. 6 and 7 there are shown light-permeability curves measured in the wavelength range of 400-700 nm for visible light, of some multi-layer packaging materials of the invention and the state of the art. In FIG. 6, the curve 8 has been obtained from cardboard of bleached pulp, with a weight of 240 g/m² and with a coating of 20 g/m² of clear, unpigmented polyethylene (PE-LD); curve 9 has been obtained from likewise coated cardboard of bleached pulp, with a weight of 300 g/m²; curve 10 has been obtained from similarly coated cardboard of unbleached pulp, with a weight of 239 g/m², and the curve 11 illustrating the invention has been obtained from cardboard of bleached pulp, with a weight of 240 g/m² and coated with 20 g/m² of polyethylene (PE-LD) which was tinted grey by blending into it 0.12% of carbon black and 7.5% of titanium dioxide.

By comparing the curves 8 and 9 of FIG. 6, the increase of light transmission, which is a consequence of thinning the cardboard manufactured of bleached mass, can be observed. The curve 10 further indicates that if the cardboard is made of unbleached pulp, the problem of light transmission hardly exists. The substantially corresponding light permeability of curve 11 has been achieved by a polymeric coating layer of the invention, tinted grey with the help of white and black pigment.

FIG. 7 contains light transmission curves measured as in FIG. 6, illustrating the effect of the amount of titanium dioxide and carbon black to the absorption of light. The curve 9 illustrating the state of the art and the curve 11 illustrating the present invention are similar to those in FIG. 6. The curve 12 has been obtained from cardboard of bleached pulp, with a weight of 300 g/m and coated with 20 g/m² of polyethylene (PE-LD) containing 7.5% of titanium dioxide. The curve 13 was obtained from the same base cardboard, which was coated with 17 g/m² of the said polyethylene bleached white, with 3 g/m² of the said polyethylene tinted grey blended with it. By comparing the curves in FIG. 7, it can be noted that the titanium dioxide has a relatively small effect on the reduction of light transmission, as again the carbon black, even as low concentrations as 0.018%, reduces the light permeating the material to under a third of the value it would be without the adding of pigment.

The invention was further tested by following the change in ascorbic acid concentration in packed apple juice during a five week long durability test in storage temperatures of 9° C. and 23° C. The packages were heat-sealed closed cartons, in which packaging cardboard of the invention was used, the weight of which was 240 g/m², and which was coated with 5 g/m² of ethylene vinyl alcohol copolymer, 6 g/m² of polymeric binding agent, and on top 45 g/m² of polyethylene (PE-LD) blended with 0.12% of carbon black and 7.5% of titanium dioxide, with which the layer was tinted grey. The reference material was a packaging cardboard similarly coated with polymer, but without the pigments added to the topmost heat sealing layer.

Ascorbic acid concentration was measured from the juices at the moment of packaging and after a storage time of two and five weeks. The results are shown in the following table.

TABLE

| Change in the ascorbic acid concentration (mg/l) in apple juice | | | |
| --- | --- | --- | --- |
| Storage time | 0 | 2 weeks | 5 weeks |
| Invention 9° C. | 450 | 395 | 355 |
| Invention 23° C. | 450 | 355 | 340 |
| Reference 9° C. | 450 | 375 | 155 |
| Reference 23° C. | 450 | 275 | 145 |

The results show the considerable improvement in the preservation of ascorbic acid in packed juice, achieved by the invention.

It is obvious for one skilled in the art that the various forms of embodiment of the invention are not restricted to the above examples, but they may vary within the scope of the enclosed claims. Instead of cardboard, also paper may be used as the middle layer of the packaging materials, which is suitable for dry package embodiments. In addition, the polymeric heat sealing layer can be provided only on one side of the packaging material. On the other side of the material, especially on the outer side of dry packages, heat-sealable lacquer can be used.

The invention claimed is:

1. Multi-layer heat-sealable packaging material especially for food packages, comprising a body layer of fibre material, at least one gas proof polymeric barrier layer protecting the packed product, and at least one polymeric heat sealing layer as a surface layer of the material, wherein said at least one polymeric heat sealing layer comprises a heat sealing layer containing black and white pigments blended with the heat sealing polymer, wherein
   the heat sealing layer comprises 0.05-0.2% of black pigment based on the amount of polymer and 5-25% of white pigment based on the amount of polymer,
   the light-absorbing black pigment protects the product from visible light, and
   the black and white pigments are provided in the layer on the inner surface of the package, said black and white pigments together impart an aluminum colour to the heat sealing layer.

2. Packaging material according to claim 1, characterised in that the black pigment is carbon black and the white pigment is titanium dioxide.

3. Packaging material according to claim 1, characterised in that the polymer in the heat sealing layer is polyolefin.

4. Packaging material according to claim 3, characterised in that the polymer in the heat sealing layer is low-density polyethylene (PE-LD).

5. Packaging material according to claim 1, characterised in that it comprises polymeric heat sealing layers on both sides of the material.

6. Packaging material according to claim 1, characterised in that the polymer in the gas proof barrier layer is ethylene-vinyl-alcohol copolymer (EVOH) or polyamide (PA), or a mixture of these.

7. Packaging material according to claim 1, characterised in that the body layer is cardboard, containing bleached sulphate pulp.

8. Packaging material according to claim 1, characterised in that the heat sealing layer comprises 0.10-0.20% of black pigment based on the amount of polymer.

9. Packaging material according to claim 1, characterised in that the heat sealing layer comprises 10-20% of white pigment based on the amount of polymer.

10. Packaging material according to claim 9, characterised in that the heat sealing layer comprises 10-15% of white pigment based on the amount of polymer.

11. Packaging material according to claim 1, wherein the heat sealing layer comprises 0.15 weight-% of carbon black pigment based on the amount of polymer and 12 weight-% of white titanium dioxide pigment based on the amount of polymer.

12. Multi-layer heat-sealable packaging material especially for food packages, comprising a body layer of fibre material and at least one aluminum-colored protective layer protecting the packed product; characterised in that the protective layer contains polymer, in which the aluminum color has been achieved by blending with it light-absorbing black pigment and white pigment, wherein the protective layer comprises 0.05-0.2% of black pigment based on the amount of polymer and 5-25% of white pigment based on the amount of polymer, so that the black pigment provides the product with a protection against visible light, and that the polymeric protective layer simultaneously acts as a heat sealing layer.

13. The multi-layer heat-sealable packaging material of claim 12, wherein the light-absorbing black pigment is carbon black and the white pigment is titanium dioxide.

* * * * *